(12) United States Patent  
Cabaret De Alberti et al.

(10) Patent No.: US 7,772,995 B2
(45) Date of Patent: Aug. 10, 2010

(54) DISPLAY SYSTEM FOR AIRCRAFT

(75) Inventors: Rémi Cabaret De Alberti, Toulouse (FR); Hélène Cabaniols, Tournefeuille (FR); Christian Serieyssols, Pibrac (FR); Benjamin Dugue, Toulouse (FR)

(73) Assignee: Airbus France, Toulouse (FR)

( * ) Notice: Subject to any disclaimer, the term of this patent is extended or adjusted under 35 U.S.C. 154(b) by 503 days.

(21) Appl. No.: 11/774,299

(22) Filed: Jul. 6, 2007

(65) Prior Publication Data

US 2010/0019939 A1    Jan. 28, 2010

(30) Foreign Application Priority Data

Jul. 6, 2006    (FR) .................................. 06 06173

(51) Int. Cl.
*G01C 21/00* (2006.01)
(52) U.S. Cl. ...................... 340/980; 340/973; 340/975; 340/971; 345/7
(58) Field of Classification Search ................ 340/980, 340/973–975, 971; 345/7
See application file for complete search history.

(56) References Cited

U.S. PATENT DOCUMENTS

| 3,738,733 | A | | 6/1973 | Pettit |
| 5,663,815 | A | * | 9/1997 | Molteni et al. ................ 359/13 |
| 5,808,563 | A | | 9/1998 | Ching et al. |
| 6,057,786 | A | | 5/2000 | Briffe |

FOREIGN PATENT DOCUMENTS

EP    0730212    9/1996

OTHER PUBLICATIONS

Preliminary Search Report dated Mar. 1, 2007.

* cited by examiner

*Primary Examiner*—Davetta W Goins
*Assistant Examiner*—Ojiako Nwugo
(74) *Attorney, Agent, or Firm*—Dickinson Wright PLLC

(57) ABSTRACT

A display system for an aircraft includes a device for controlling the presentation on a head-down screen of primary piloting information during a detected display defect on a head-up display device, which normally displays such primary piloting information.

6 Claims, 1 Drawing Sheet

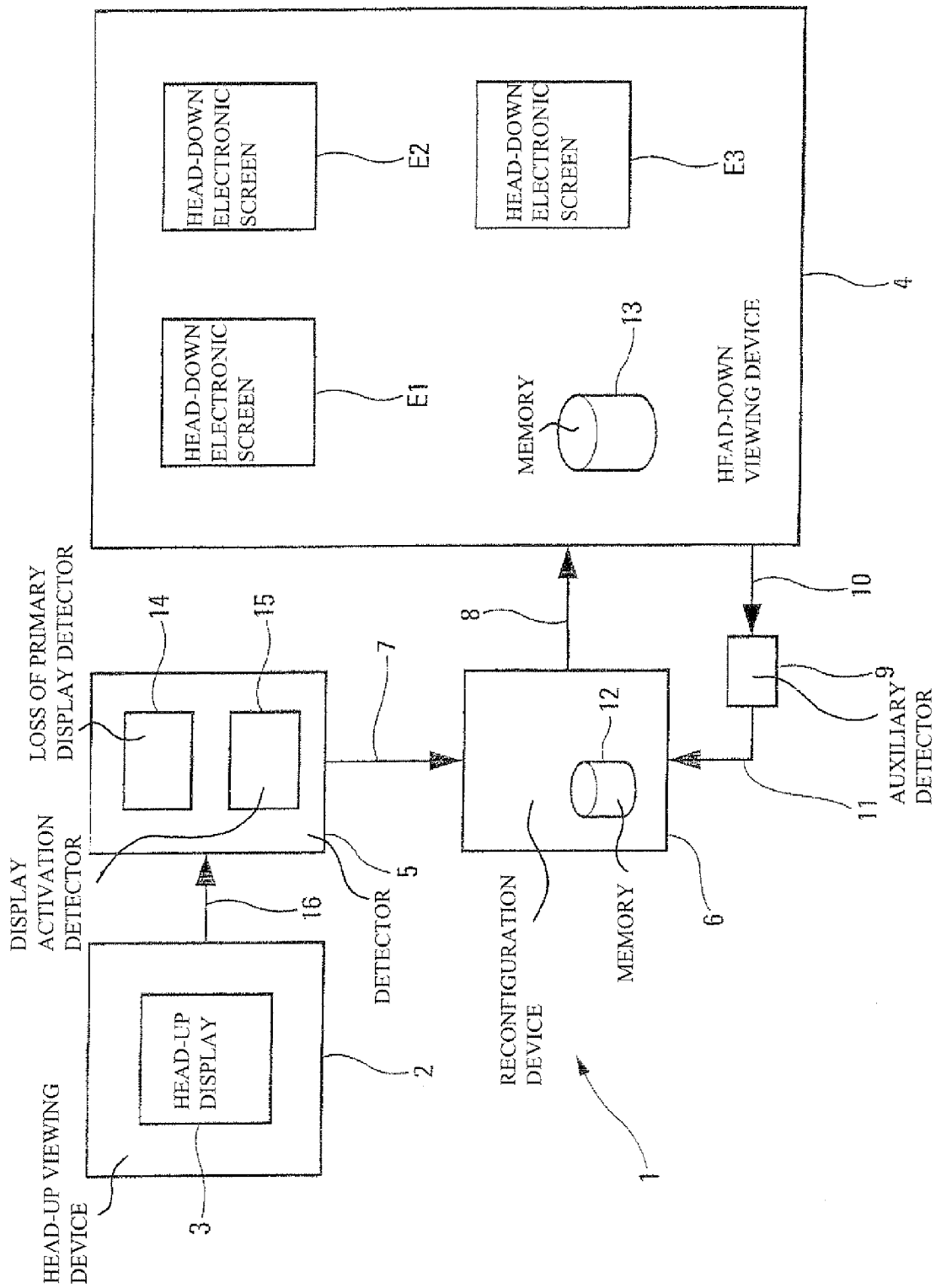

DISPLAY SYSTEM FOR AIRCRAFT

BACKGROUND OF THE INVENTION OF DESCRIPTION OF THE PRIOR ART

1. Field of the Invention

The present invention relates to a display system for an aircraft, in particular for a military transport plane.

More particularly, it relates to a display system comprising a head-down viewing device which comprises a plurality of electronic screens, of head-down type, that is to say which are provided on the instrument panel of the aircraft, and which present specific displays relating to the flight of the aircraft. Such a head-down viewing device may comprise, like any head-down screen, for example, a display and control system of CDS type ("Control and Display System"), a system relating to electronic instruments of EIS type ("Electronic Instrument System"), and/or any other standard screen.

2. Background of the Related Art

On an airplane, such as a civil transport plane for example, the head-down viewing device also comprises at least one screen, for example a primary piloting screen of PFD ("Primary Flight Display") type, which is intended to display primary piloting information for the aircraft, such as the speed, altitude, attitude and/or heading in particular. It is known that this primary piloting information represents the most important information for the actual piloting.

On the other hand, in numerous military planes, in particular new-generation military transport planes, this primary piloting information is displayed in particular (and generally exclusively) on a (head-up) display means of a head-up viewing device of HUD type ("Head-Up Display"), this being in particular so as to facilitate the piloting of the airplane. It is known that such a head-up viewing device presents the information to be viewed superimposed on the environment seen in front of the aircraft, on a head-up display means which is transparent. Generally, the various items of information are projected directly onto this head-up display means which may be brought into the pilot's field of vision.

Thus, the pilot is directly aware of the essential piloting information, without needing to lower his head. This affords valuable aid to piloting and makes it possible to increase flight safety.

However, when there is a fault with such a head-up viewing device or when the latter is deliberately deactivated, this essential information is no longer available to the pilot, and this could disturb him during piloting, in particular in flight phases that are difficult to carry out and require deep concentration, such as a low-altitude flight, an approach or a take off for example.

SUMMARY OF THE INVENTION

The present invention relates to a display system for an aircraft, in particular a military transport plane, which makes it possible to remedy the aforesaid drawbacks.

For this purpose, according to the invention, said display system of the type comprising:

- a head-up viewing device, which presents, on a head-up display means, superimposed with the environment seen in front of the aircraft, a primary display comprising at least primary piloting information for the aircraft; and
- a head-down viewing device which comprises a plurality of head-down screens presenting specific displays relating to the flight of the aircraft, is noteworthy in that it furthermore comprises:

- detection means for automatically detecting a defect in the primary display implemented by said head-up viewing device and for emitting, as appropriate, at least one corresponding signal; and
- reconfiguration means for receiving any signal emitted by said detection means and for automatically reconfiguring said head-down viewing device upon receipt of such a signal (indicating a defect in the display of the head-up viewing device) in such a way as to modify the display of at least one first of said head-down screens so that this first head-down screen presents, in place of its specific display, an auxiliary display comprising at least said primary piloting information which is presumed presented on said head-up display means.

Thus, by virtue of the invention, upon a failure in the primary display (presenting the primary piloting information) which is implemented on the head-up display means, the primary piloting information necessary for piloting is automatically and immediately presented on one of the head-down screens of the aircraft. This makes it possible to ensure, during such a failure, continuity of presentation of this information (for example the speed, altitude, attitude and/or heading) which is essential for piloting. Consequently, the pilot is always aware of the essential information, even in the absence of a valid head-up display. The flight safety of the aircraft is thus increased, in particular in flight phases requiring significant vigilance such as a low-altitude flight, an approach or a take off.

In a particular embodiment, said display system also comprises auxiliary detection means capable of automatically detecting failures of said head-down screens and of emitting as appropriate corresponding information. Furthermore, said reconfiguration means comprise a first memory containing an order of priority of display relating to said head-down screens, and said reconfiguration means are formed in such a way as to choose (from among the various head-down screens of the head-down viewing device) said first head-down screen (on which said auxiliary display is presented) on the basis of said order of priority recorded in said first memory and of information received from said auxiliary detection means (which information therefore relates to possible faults with one or more of said head-down screens).

Thus, by virtue of said predetermined order of priority, it is possible to select, from among the non-faulty head-down screens, to present said primary display (that is to say said primary piloting information, in place of the standard specific display), that one which presents the information least important to piloting or that one which is positioned in the flight deck in such a way as to require the least movement of the pilot's head so as to be able to be read during the piloting of the aircraft. Moreover, by virtue of such a selection (taking account of any fault), the primary piloting information may always be displayed, even if one or more of the head-down screens is faulty.

In a preferred embodiment:

- said head-up viewing device comprises means allowing an operator to activate and deactivate the primary display implemented on said head-up display means;
- said detection means are capable of automatically detecting a deactivation of said primary display, as well as an end of deactivation;
- said reconfiguration means are formed in, such a way as to automatically control:
  - upon detection of a deactivation of said primary display, the presentation of the auxiliary display on the first head-down screen; and upon detection of an end of deactivation, the return to an initial display on said first head-down screen; and said head-down viewing device comprises at least one second memory making it possible:

to record the initial display existing on said first head-down screen before it displays said auxiliary display; and to restore this initial display to said first head-down screen at the end of a deactivation.

Additionally, in a particular embodiment:

said detection means comprise:

a first element capable of detecting a loss of the primary display, as well as an erroneous primary display, and of emitting as appropriate a first information item indicating such a situation; and a second element capable of detecting an activation and a deactivation of said head-up display means and of emitting as appropriate a second information item indicating such a situation; and said reconfiguration means control the presentation of said auxiliary display on said first head-down screen and possibly the return to an initial display, on the basis of said first and second information items received from said detection means.

In this case, advantageously:

said head-up display means is formed in such a way as to be able to be brought manually either into a deployed position for which it is activated, or into a folded-back position for which it is deactivated; and said second element is formed in such a way as to be able to automatically determine the position, deployed or folded-back, of said head-up display means, which illustrates its activation or deactivation.

Thus, when the pilot redeploys (or reactivates) the head-up display means after a deactivation, the display system in accordance with the invention returns automatically to the initial display, without any action from the pilot. This makes it possible in particular to reduce the latter's workload.

BRIEF DESCRIPTION OF THE DRAWING

The single FIGURE of the appended drawing will elucidate the manner in which the invention may be embodied. This single FIGURE is the schematic diagram of a display system in accordance with the invention.

DESCRIPTION OF THE PREFERRED EMBODIMENT

The display system 1 in accordance with the invention and represented in the FIGURE is intended to display information in the flight deck of an aircraft, for example a military transport plane, not represented.

To do this, said display system 1 comprises:

a head-up viewing device 2, which presents, in a standard manner, on a head-up display means 3 specified hereinbelow, superimposed with the environment seen in front of the aircraft, a primary display comprising at least primary piloting information for said aircraft such as in particular its speed, altitude, latitude and/or heading; and a head-down viewing device 4 which comprises a plurality of head-down electronic screens E1, E2, E3 . . . arranged preferably at the instrument panel level in the flight deck.

These head-down screens E1 to E3 present standard specific displays, relating to the flight of the aircraft, that is to say relating to the state of the aircraft and/or to its environment.

By way of illustration, these screens E1 to E3 of standard type may, in particular, present at least some of the following information:

navigation information;

monitoring information;

information relating to the engines of the aircraft;

procedural information; and information relating to systems (computer, display means, etc.) of the aircraft.

To be able to remedy a loss (temporary or definitive) of the primary display presented on said head-up display means 3, said display system 1 moreover comprises, according to the invention:

detection means 5 specified hereinbelow, which are capable of automatically detecting a defect in the primary display implemented by the head-up viewing device 2 and for emitting, as appropriate, at least one signal indicating such a defect; and reconfiguration means 6 which are connected by way of a link 7 to said detection means 5 in such a way as to be able to receive any signal emitted by these detection means 5 and which are formed in such a way as to automatically reconfigure the head-down viewing device 4 upon receipt of such a signal indicating a defect of the primary display.

According to the invention, to carry out such a reconfiguration, the reconfiguration means 6 control by way of a link 8 the modification of the display of at least one of said head-down screens E1 to E3. This modification consists in replacing the specific display implemented on this screen, by an auxiliary display which comprises at least the primary piloting information (which is presumed to be represented on the head-up display means 3 and which can no longer be so displayed on account of said defect of the primary display).

Thus, by virtue of the display system 1 in accordance with the invention, upon a failure in the primary display (presenting the primary piloting information) which is implemented on the head-up display means 3, the primary piloting information necessary for piloting is automatically and immediately presented on one of the head-down screens E1, E2, E3 of the aircraft (in the form of said auxiliary display). Such an automatic reconfiguration makes it possible to ensure, upon a failure of the aforesaid type, continuity of presentation of this information (for example the speed, altitude, attitude and/or heading) which is essential for piloting.

Consequently, the pilot can always be aware of the essential information, even in the absence of a valid head-up display. The flight safety of the aircraft is thus increased, in particular in flight phases requiring significant vigilance such as a low-altitude flight, an approach or a take off.

Within the framework of the present invention, and as specified hereinbelow, a defect in the primary display may be due to a problem in the operation (fault or no voltage) of the head-up viewing device 2 or to a deactivation of said head-up display means 3.

In a particular embodiment, said display system 1 also comprises auxiliary detection means 9 which are connected by way of links 10 and 11 to said head-down viewing device 4 and to said detection means 5 and which are capable of automatically detecting any failure of one or more of said head-down screens E1 to E3 and of emitting as appropriate information (or a signal) indicating such a failure. Furthermore, the reconfiguration means 6 comprise a memory 12 which contains an order of priority of display relating to said head-down screens E1 to E3. Moreover, said reconfiguration means 6 are formed in such a way as to carry out a particular selection so as to choose the head-down screen on which to present said auxiliary display, from among the various head-down screens E1 to E3 forming part of said head-down viewing device 4. More precisely, said reconfiguration means 6 carry out this selection, on the basis, on the one hand, of the order of priority which is recorded in said memory 12, and, on the other hand, as appropriate, of information relating to a failure of one or more of said screens E1 to E3, which is received from said auxiliary detection means 9.

More precisely, said order of priority recorded in the memory 12 indicates which of the various screens E1 to E3 is to be used by priority if it is not faulty, and otherwise which other screen is to be used if this first screen is faulty, or in the case where this first and this second screens are faulty which other screen is to be used, and so on and so forth. Consequently, by virtue of this particular embodiment, the primary piloting information may always be displayed in head-down mode, even if one or more of said screens E1 to E3 is faulty. By way of illustration, it is possible to choose an order of priority making it possible to use, by priority, the head-down screen which in principle presents the information least important for piloting or else that one which is positioned in the flight deck in such a way as to require the least movement of the pilot's head, so as to be able to be read during the piloting of the aircraft.

In a particular embodiment, for which the head-down viewing device 4 comprises an outside screen E1, an inside screen E2 and a lower screen E3, the order of priority may be as follows:
- first priority: the outside screen E1;
- second priority: the inside screen E2; and
- third priority: the lower screen E3.

Additionally, in a particular embodiment:
- said head-up viewing device 2 comprises means specified hereinbelow, allowing an operator to activate and deactivate the primary display implemented on said head-up display means 3;
- said detection means 5 are capable of automatically detecting a deactivation of said, primary display, as well as an end of deactivation;
- said reconfiguration means 6 are formed in such a way as to automatically control:
  - upon detection of a deactivation of said primary display, the presentation of the auxiliary display on the priority head-down screen; and
  - upon detection of an end of deactivation, the return to an initial display on said priority head-down screen; and
- the head-down viewing device 4 comprises at least one memory 13 which is formed in such a way as to record the display, for example a navigation format, which exists on the (priority) head-down screen selected (for example the screen E1) before the latter displays said auxiliary display, in the event of a defect on said head-up display means 3. This memory 13 is formed in such a way as to restore this initial display (navigation format for example) on said head-down screen (screen E1 for example) as soon as there is a reactivation of said head-up display means 3 (that is to say as soon as a deactivation is detected).

Within the framework of the present invention, said head-up viewing device 2 comprises, in a standard manner, the following constituent elements (which are not all represented individually in the FIGURE):
- a memory;
- a computer;
- a projection unit; and
- said display means 3 which corresponds to a transparent screen which is fixed on the windshield of the aircraft and which may be brought into the pilot's field of vision (in the piloting position), and onto which said projection unit projects the information to be displayed. This information is then seen by the pilot superimposed on the environment existing in front of the aircraft, when he looks outside said aircraft.

This head-up display means 3 is generally formed in such a way as to be able to be folded back and deployed manually by the pilot in such a way that it can be brought:
- either into a deployed position, for which it is situated in the pilot's field of vision and it is activated;
- or into a folded-back position, for which it is outside of the field of vision and it is deactivated.

Such a head-up viewing device 2 is generally provided on an aircraft such as a military transport plane, either as a single unit which is intended for the pilot, or as two units which are intended respectively for the pilot and for the copilot. Furthermore, in addition to the primary piloting information, such a head-up viewing device 2 may also present navigation information and/or guidance information as well as possibly video images of the outside.

Thus, when the pilot redeploys (or reactivates) the head-up display means 3 after an earlier deactivation (folding back), for example for a rudder bar adjustment, the display system 1 in accordance with the invention returns automatically to the initial display, without any action from the pilot. This makes it possible in particular to reduce the latter's workload.

In a particular embodiment:
- said reconfiguration means 6 are connected, via the link 8, to a network connecting together the various screens E1 to E3 of the head-down viewing device 4, for example a network of AFDX standard type, in such a way as to be able to transmit a fault information item; and
- there is also provision for a communication between the various screens E1 to E3, for example in the form of a standard bus CAN, making it possible to ensure the reconfiguration logic implemented within the framework of the present invention.

Additionally, in a particular embodiment, said detection means 5 comprise:
- an element 14 capable of detecting a loss of the primary display, as well as an erroneous primary display, and of emitting as appropriate a first information item indicating such a situation; and
- an element 15 capable of detecting an activation and a deactivation of said head-up display means 3 and of emitting as appropriate a second information item indicating such a situation.

To do this, this element 15 is formed in such a way as to be able to automatically determine the position, deployed or folded-back, of said head-up display means 3, which illustrates its activation or deactivation.

In this latter particular embodiment, said reconfiguration means 6 control the presentation of said auxiliary display on the priority head-down screen, and possibly the return to an initial display, on the basis of said first and second information items received from said detection means 5.

According to a preferred implementation of the invention, a return to the initial display is carried out only if the defect of the primary display is due to a folding-back of said display means 3, that is to say to a deactivation of the latter. On the other hand, when the auxiliary display is carried out on a head-down screen on account in particular of a loss of the primary display or of an erroneous primary display, said head-down screen retains this auxiliary display even when the failure (loss of primary display or erroneous primary display) which is the cause of this situation is subsequently cancelled.

Additionally, in a particular embodiment, said detection means 5 may be integrated into the head-up viewing device 2, and said reconfiguration means 6 may be integrated into the head-down viewing device 4.

What is claimed is:

1. A display system for an aircraft, comprising:
    a head-up viewing device, which presents, on a head-up display means, superimposed with the environment seen in front of the aircraft, a primary display comprising at least primary piloting information for the aircraft; and
    a head-down viewing device which comprises a plurality of head-down screens presenting specific displays relating to the flight of the aircraft,
    which furthermore comprises:
    detection means for automatically detecting a defect in the primary display implemented by said head-up viewing device and for emitting, as appropriate, at least one corresponding signal; and
    reconfiguration means for receiving any signal emitted by said detection means and for automatically reconfiguring said head-down viewing device upon receipt of such a signal in such a way as to modify the display of at least one first of said head-down screens so that this first head-down screen presents, in place of its specific display, an auxiliary display comprising at least said primary piloting information which is presumed presented on said head-up display means.

2. The display system as claimed in claim 1, which moreover comprises auxiliary detection means that detect automatically failures of said head-down screens and emit as appropriate corresponding information, wherein said reconfiguration means comprise a first memory containing an order of priority of display relating to said head-down screens, and wherein said reconfiguration means are formed in such a way as to choose, from among said head-down screens, said first head-down screen, on which said auxiliary display is presented, on the basis of said order of priority recorded in said first memory and of information received from said auxiliary detection means.

3. The display system as claimed in claim 1, wherein:
    said head-up viewing device comprises means allowing an operator to activate and deactivate the primary display implemented on said head-up display means;
    said detection means automatically detect a deactivation of said primary display, as well as an end of deactivation;
    said reconfiguration means are formed in such a way as to automatically control:
        upon detection of a deactivation of said primary display, the presentation of the auxiliary display on the first head-down screen; and
        upon detection of an end of deactivation, the return to an initial display on said first head-down screen; and
    said head-down viewing device comprises at least one second memory making it possible:
        to record the initial display existing on said first head-down screen before it displays said auxiliary display; and
        to restore this initial display to said first head-down screen at the end of a deactivation.

4. The display system as claimed in claim 1, wherein:
    said detection means comprise:
        a first element that detects a loss of the primary display, as well as an erroneous primary display, and emits as appropriate a first information item indicating such a situation; and
        a second element that detects an activation and a deactivation of said head-up display means and emits as appropriate a second information item indicating such a situation; and
    said reconfiguration means control the presentation of said auxiliary display on said first head-down screen and possibly the return to an initial display, on the basis of said first and second information items received from said detection means.

5. The display system as claimed in claim 4, wherein:
    said head-up display means is formed in such a way as to be able to be brought manually either into a deployed position for which it is activated, or into a folded-back position for which it is deactivated; and
    said second element is formed in such a way as to be able to automatically determine the position, deployed or folded-back, of said head-up display means, which illustrates its activation or deactivation.

6. An aircraft, which comprises the display system specified under claim 1.

* * * * *